United States Patent [19]

De Rooij et al.

[11] 3,907,781

[45] Sept. 23, 1975

[54] PROCESS FOR RECOVERY OF ε-CAPROLACTAM FROM A REACTION MIXTURE OF ε-CAPROLACTAM AND SULPHURIC ACID

[75] Inventors: Abraham H. De Rooij, Geleen; Jan Elmendorp, Brunssum, both of Netherlands

[73] Assignee: Stamicarbon, B.V., Geleen, Netherlands

[22] Filed: June 24, 1974

[21] Appl. No.: 482,601

[30] Foreign Application Priority Data

June 26, 1973 Netherlands ................... 7308834

[52] U.S. Cl. ........................... 260/239.3 A; 423/549
[51] Int. Cl.$^2$ ................. C07D 201/18; C01C 1/242
[58] Field of Search ............. 260/239.3 A; 423/549

[56] References Cited
UNITED STATES PATENTS

| | | | |
|---|---|---|---|
| 2,993,889 | 7/1961 | Muytjens et al. | 260/239.3 A |
| 3,336,298 | 8/1967 | De Rooij | 260/239.3 A |
| 3,852,272 | 12/1974 | De Rooij | 260/239.3 A |
| 3,852,273 | 12/1974 | De Rooij | 260/239.3 A |

*Primary Examiner*—Henry R. Jiles
*Assistant Examiner*—Robert T. Bond
*Attorney, Agent, or Firm*—Cushman, Darby & Cushman

[57] ABSTRACT

ε-caprolactam is recovered from a Beckmann rearrangement mixture of the lactam and aqueous sulfuric acid by simultaneously neutralizing the rearrangement mixture with ammonia at a pressure of 1–5 atmospheres and crystallizing out ammonium sulfate, the heat liberated by the neutralization reaction is removed from the system by evaporating a portion of the water from the solution. At the conditions employed hydrolysis of the lactam is substantially reduced if not entirely avoided.

2 Claims, 2 Drawing Figures

PROCESS FOR RECOVERY OF ε-CAPROLACTAM FROM A REACTION MIXTURE OF ε-CAPROLACTAM AND SULPHURIC ACID

This invention relates to the purification and recovery of ε-caprolactam from a reaction mixture containing the lactams and sulfuric acid.

BACKGROUND OF THE INVENTION

According to known intramolecular rearrangement processes the various lactams can be obtained from the corresponding cyclic oximes with the use of various acids. This reaction according to Beckmann (known as a Beckmann rearrangement) is practiced on the commercial scale in the preparation of ε-caprolactam from cyclohexanone oxime using sulfuric acid, oleum or $SO_3$ as the acid source, in which, ultimately, a reaction mixture of caprolactam and sulfuric acid is obtained.

In another synthesis route ε-caprolactam is prepared by reacting cyclohexane carboxylic acid or derivatives thereof with an agent introducing the nitroso group, also in the presence of sulfuric acid, which again ultimately results in a reaction mixture composed primarily of lactam and sulfuric acid. The ε-caprolactam produced by either of these processes, after further purification, if needed, is polymerized into nylon.

In order to separate the lactam, contained in the sulfuric acid rich reaction mixtures, the mixture is generally neutralized with ammonia water which forms a layer of "lactam oil" floating on top, that is a layer of approximately 70% by weight solution of lactam in water, and of a lower layer consisting of a concentrated solution of ammonium sulfate in water. After separation of these layers, further processing into the products lactam and solid ammonium sulfate takes place, in which ammonium sulfate is crystallized out of the concentrated ammonium sulfate solution by evaporating the water.

In this known process the neutralization of the sulfuric acid and conversion into ammonium sulfate has always been conducted as a separate step from the crystallization of the ammonium sulfate and removed from the concentrated solution.

Previous work has proposed that these treatments be conducted together. For instance, according to the process described in Netherlands Patent Specification 59,956 the sulfuric acid rearrangement mixture is mixed with a volume of concentrated ammonium sulfate solution and there neutralized with, preferably, gaseous ammonia. In this process the solid ammonium sulfate crystallizes out and is separated off, whereupon the liquid phase is allowed to separate into two layers, a "lactam oil" layer and a saturated solution of ammonium sulfate; the ammonium sulfate solution may be recycled again.

In this process neutralization takes place at a relatively low temperature since in this treatment the heat of neutralization is dissipated by direct cooling. However, this known process has with it the disadvantage that the ammonium sulfate crystals crystallizing out during the cooling deposit on the cooling surfaces and builds up, as a result of which the heat discharge effect deteriorates.

In another known process, as described in the British Patent Specification 1.123.472 the neutralization and crystallization also take place in one treatment wherein the rearrangement mixture and the neutralizing ammonia are directed into a volume of ammonium sulfate solution. In this process, the heat liberated by the neutralization reaction is not discharged through cooling, but rather through evaporation of water at a lower temperature in order to avoid hydrolysis of the lactam. This process has the disadvantage that, as a practical matter, conducting the neutralization and crystallization at a low temperature requires the use of reduced pressure, such as 0.055 – 0.095 atm. at abs.

The process according to the present invention eliminates the disadvantages of the known processes as described above.

DETAILED DESCRIPTION OF THE INVENTION

The present invention is characterized in avoiding cooling surfaces on which crystals may deposit and elimination of vacuum producing apparatus and with it the energy savings otherwise needed for maintaining the vacuum conditions.

We have now found that without any risk of losses through hydrolysis of lactam the neutralization and crystallization can take place together in a single stage at atmospheric pressure at the relatively high boiling point of the reaction mixture. This boiling point amounts to about 108°C.

It has further appeared that also higher temperatures, e.g. of 140°C (corresponding with a pressure of about 4 atmospheres), are allowable, so that also pressures in excess of 1 atmosphere may be applied and the evaporating water can be recovered in the form of steam, having a pressure of e.g. 4 atmospheres. Up to a temperature corresponding with a pressure of about 5 atmospheres only small losses resulting from lactam hydrolysis appear to occur.

The invention provides a process for recovery of ε-caprolactam and ammonium sulphate crystals from a reaction mixture containing the lactam and sulphuric acid, comprising neutralizing the said reaction mixture in a neutralization zone at a pressure of 1–5 atmospheres with ammonia in a circulating volume of ammonium sulphate solution to simultaneously form ammonium sulphate crystals, separating the neutralized solution into a supernatent layer lactam-rich aqueous solution and a suspension of ammonium sulphate crystals in ammonium sulphate solution, recovering the said lactam-rich layer, separating the said crystals from the suspension thereof, and recycling the separated mother liquor to the said neutralization zone, wherein the heat of neutralization is removed by evaporation of water from the neutralized solution. The neutralization is preferably carried out at a pressure between 1 and about 2 atmospheres because in that case practically no lactam losses occur.

More particularly the present process compared with the one-stage known process displays the following advantages:

a. No energy is required to maintain a vacuum
b. No vacuum equipment is required; and
c. By application of a pressure in excess of 1 atmosphere steam can be recovered at the same time. Per ton of lactam, e.g., 1 ton of steam of 2 atmospheres can be recovered.

The pH of the circulating mixture is generally within the range of about 3.0 to about 5.0 and preferably 3.3 to 4.5; see FIG. 2 and the working example that follows. The residence time for the circulating mixture in the system varies from 15 minutes up to as much as 10 hours or longer; preferably this value is about 45 minutes to about 1 hour or so.

In the process according to the present invention the heat liberated by the neutralization reaction is discharged by evaporation of the solvent (water) which may be condensed and the condensate being returned if desired. Therefore special means are not required to keep the temperature of the suspension at a low value; the neutralization and the crystallization take place at a pressure of 1–5 atmospheres in a volume of circulating saturated solution of ammonium sulfate. The water evaporated by the heat of reaction is condensed and returned as such or may be converted into steam. In order for the water balance to be kept in equilibrium virtually the same quantity of water is returned to the system during the neutralization as is discharged along with the "lactam oil" and the ammonium sulfate crystals produced or with the quantity of steam produced.

The invention will be further described by means of the drawings.

Figure 1:
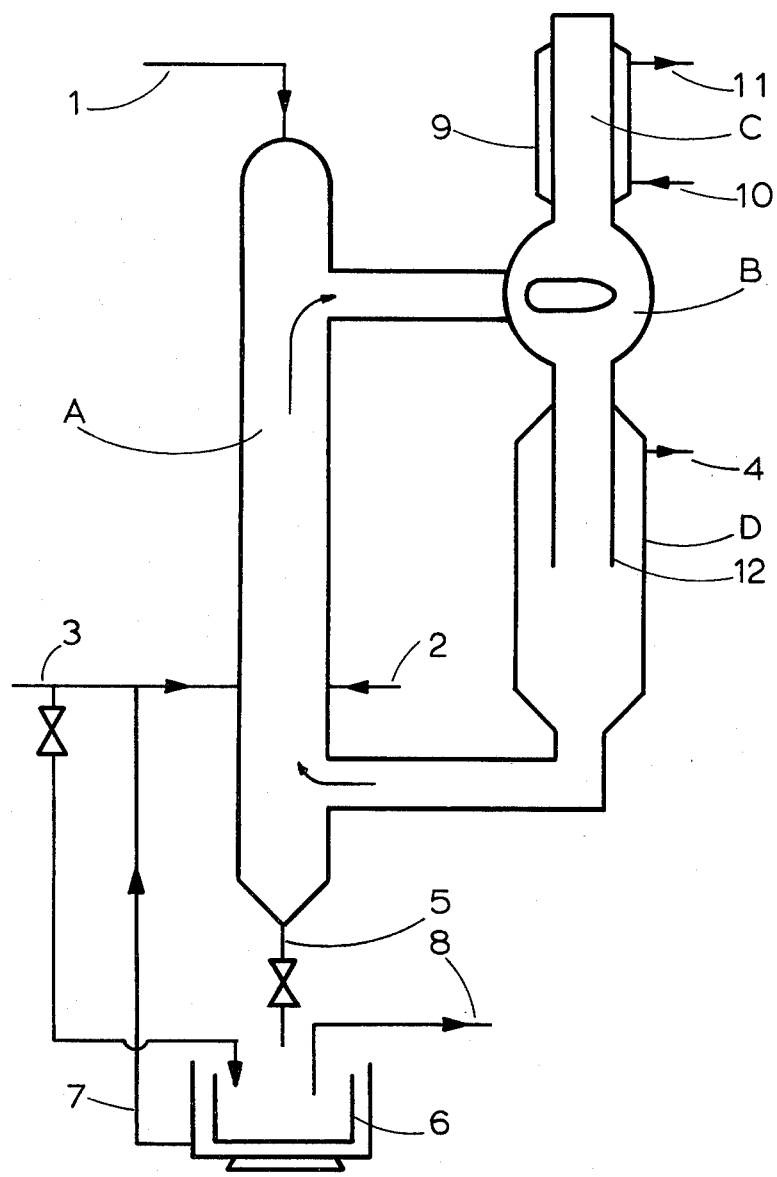
FIG. 1 represents schematically an apparatus for conducting the present invention.

FIG. 1 illustrates schematically one method of conducting the process of the present invention. In this figure A represents a neutralization column connected at the top, by means of a side delivery tube, with a spherical boiling chamber B, in which the side tube is arranged tangentially with respect to the walls of the sphere. A condenser C is communicated to the top of boiling chamber B while at the bottom, the boiling chamber B is communicated to a settlement vessel D via a dip tube 12, the settlement vessel, in turn, being connected to the lower end of column A, thus completing the circuit.

When the above-described equipment is in operation, a rearrangement mixture is introduced via line 1, $NH_3$ gas via line 2, and water via line 3 all into neutralization column A. As the neutralization reaction proceeds and the volatile portions of the reaction mixture are delivered over to boiling chamber B, the boiling mixture which is a suspension of ammonium sulfate crystals in a solution of lactam saturated with ammonium sulfate, flows back to column A via boiling chamber B and settlement vessel D into the lower end of column A. This recirculating liquid mass dilutes considerably the highly acid supply to the boiling chamber. As a result of this arrangement the risk of highly acid concentrations and, hence, hydrolysis of lactam, is avoided.

On the laboratory equipment scale, as shown, the circulation is maintained by introducing nitrogen into the closed system via line 2, together with the $NH_3$ gas; the ascending gas bubbles bring about the required circulation. Of course, when carried out on a commercial scale the circulation may be maintained by means of a pump.

The water vapor produced in the boiling vessel B is condensed in reflux condenser C, positioned above the boiling chamber B, the condenser equipped with a cooling jacket 9 and with supply and discharge lines 10 and 11 for cooling water.

In the settlement vessel D, the space between the wall and the external side of the dip tube 12 is in effect a settlement space; it is here that a top layer of "lactam oil" separates off, and is discharged via line 4.

A suspension of ammonium sulfate crystals is drained from the neutralization column via line 5 into centrifuge 6. Mother liquor and wash water are recycled via line 7 and washed ammonium sulfate crystals are discharged as a product via line 8. In the process according to the present invention the quantity of water discharged from the system, the water being mainly carried along with the lactam oil (except for the wash water required for washing the crystals) may be replenished continuously with fresh water supplied through the line 3. Instead of fresh water, the water may also be supplied in the form of an ammonium sulfate solution obtained in another step of the caprolactam synthesis process, for instance in the preparation of cyclohexanone oxime, as a by-product. In this way a substantial saving on the costs of evaporation is achieved.

According to this arrangement if more water is introduced into the system than can be discharged in the form of lactam oil, the extra amount of water is discharged in the form of vapor by virtue of incomplete condensation in condenser C, or in the form of condensate, through an incomplete reflux from condenser C into the boiling vessel B.

If the heat generated by the neutralization reaction is not sufficient for one-step evaporation of the total quantity of water in the system, a multiple-effect evaporation arrangement (not shown) may be employed.

The following example also serves to illustrate the process of the present invention. All parts and percentages by weight unless indicated otherwise.

EXAMPLE

Referring to the arrangement illustrated in FIG. 1 a rearrangement mixture is supplied to the neutralization chamber on an hourly basis of 730 grams per hour via the line 1. The rearrangement mixture consisted of:

| | |
|---|---|
| 43.2 % | ε-caprolactam |
| 56.4 % | $H_2SO_4$ |
| 0.43 % | "Tar" by-products. The "tar" by-products are well-known in the art and generally comprise unsaturated acids, condensed ketones, aliphatic and alicyclic carbonamides, depending on the nature of the rearrangement reaction. |

The rearrangement mixture was neutralized with $NH_3$ (143 g/h), while water (357 g/h) was introduced via line 3 and, via line 7, a wash water (110 g/h) the following composition was introduced:

| | |
|---|---|
| 22.7% | Ammonium sulfate |
| 74.6% | $H_2O$ |
| 2.7% | Caprolactam |

The average residence time of solution in the equipment was about 45 minutes to 1 hour, the temperature of the circulating crystal suspension, at a rate of 500 g per hour, was 108.5°C. Every hour "lactam oil" was discharged via line 4 at a rate of 445 g/h; the lactam oil as it is known, had the following composition:

| | |
|---|---|
| 71.09% | Lactam |
| 27.6% | $H_2O$ |
| 0.7% | $(NH_4)_2SO_4$ |
| 0.7% | "Tar" |

After the crystal mass drained via the line 5 was washed with water (82 g) per hour, coarse ammonium sulfate crystals (557 g/h) was recovered, which still contained about 1 to about 2% by weight of $H_2O$, but which were free from lactam.

Figure 2:
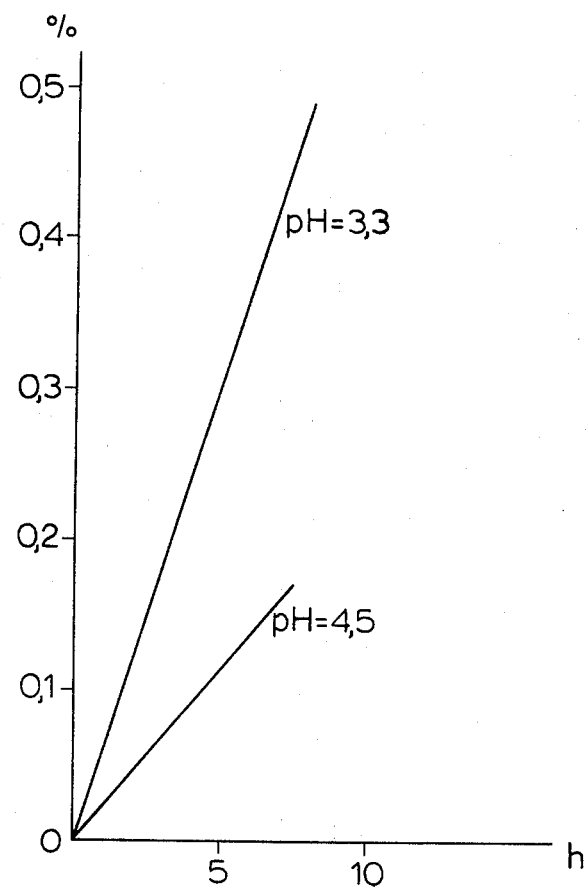
FIG. 2 is a graph of the amount of hydrolyzed lactam (to be reduced to as low a value as possible) plotted against the residence time in the apparatus for two different pH values.

When the process was tested the pH of the circulating mixture was found to be 4.5 while in another experiment the pH was observed to be 3.3. Using these pH values and at this residence time the hydrolysis of lactam appears to be so small as to be negligible, as is apparent from the graph of FIG. 2, in which the hydrolyzed amount of lactam, in percent weight of the whole, is plotted against the residence time in hours.

What is claimed is:

1. A continuous process for the recovery of ε-caprolactam from a synthesis reaction mixture composed of the lactam and sulfuric acid by concurrently neutralizing and crystallizing the synthesis reaction mixture, comprising the steps of neutralizing the synthesis reaction mixture with ammonia in a circulating volume of ammonium sulfate solution at a pressure of 1–5 atmospheres in a neutralization zone, the neutralization simultaneously forming additional ammonium sulfate crystals and liberating heat; passing the crystal-rich neutralized mixture to a boiling area and causing the mixture to boil and water vapor to be discharged from the mixture; separating the neutralized solution into a supernatent layer lactam-rich aqueous solution and a suspension of ammonium sulphate crystals in ammonium sulphate solution; recovering the lactam-rich layer; separating the ammonium sulphate crystals from the suspension; recycling the separated mother liquor to the neutralization zone, whereby the heat generated by the neutralization reaction is discharged out of the system by evaporation of a portion of the water of the recirculating mixture.

2. The process according to claim 1 wherein the neutralization is effected at a pressure of 1–2 atmospheres.

* * * * *